(12) United States Patent
Choi (10) Patent No.: US 10,000,125 B2
(45) Date of Patent: Jun. 19, 2018

(54) POWER SUPPLY APPARATUS AND METHOD FOR HYBRID VEHICLE

(71) Applicant: HYUNDAI MOBIS Co., Ltd, Seoul (KR)

(72) Inventor: Deok Kwan Choi, Yongin-Si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 360 days.

(21) Appl. No.: 14/876,074

(22) Filed: Oct. 6, 2015

(65) Prior Publication Data

US 2016/0101707 A1    Apr. 14, 2016

(30) Foreign Application Priority Data

Oct. 8, 2014   (KR) .................. 10-2014-0135878

(51) Int. Cl.
| | |
|---|---|
| *B60L 1/00* | (2006.01) |
| *B60L 3/00* | (2006.01) |
| *H02G 3/00* | (2006.01) |
| *B60L 11/12* | (2006.01) |
| *B60L 11/18* | (2006.01) |
| *H02M 3/158* | (2006.01) |
| *H02M 7/797* | (2006.01) |
| *H02M 3/156* | (2006.01) |
| *H02M 1/00* | (2006.01) |

(52) U.S. Cl.
CPC ........... *B60L 11/12* (2013.01); *B60L 11/1811* (2013.01); *B60L 11/1868* (2013.01); *H02M 3/1582* (2013.01); *H02M 7/797* (2013.01); *H02M 3/156* (2013.01); *H02M 2001/007* (2013.01); *Y02T 10/7005* (2013.01); *Y02T 10/7022* (2013.01); *Y02T 10/7066* (2013.01); *Y02T 10/7072* (2013.01); *Y02T 10/7077* (2013.01); *Y02T 90/127* (2013.01); *Y02T 90/14* (2013.01)

(58) Field of Classification Search
CPC .... H02J 7/0014; H02J 7/04; H02J 7/00; H02J 7/02; B60W 20/40; B60W 20/13; B60W 20/00; B60W 10/00; B60W 10/02; B60W 10/06; B60W 10/08; B60W 30/182
USPC ....... 307/10.1, 9.1, 10.2; 320/104, 108, 110, 320/109; 701/22, 24, 25
See application file for complete search history.

(56) References Cited

U.S. PATENT DOCUMENTS

| | | | |
|---|---|---|---|
| 9,676,281 B2* | 6/2017 | Song | B60L 3/0046 |
| 2003/0042866 A1* | 3/2003 | Minamiura | G01R 31/3658 |
| | | | 320/104 |
| 2011/0160019 A1* | 6/2011 | Harada | B60K 6/445 |
| | | | 477/7 |
| 2014/0159663 A1* | 6/2014 | Miyanaga | H02J 7/0016 |
| | | | 320/116 |

(Continued)

*Primary Examiner* — Rexford Barnie
*Assistant Examiner* — Jagdeep Dhillon
(74) *Attorney, Agent, or Firm* — NSIP Law (57) ABSTRACT

Provided are a power supply apparatus and method for a hybrid vehicle. The power supply apparatus is integrated with a power conversion device and an energy storage device in order to reduce a size and production cost of the power supply apparatus and includes a battery unit including a plurality of battery cells configured to store different levels of power and a power control unit configured to control the battery unit to integrally or selectively output the power of the plurality of battery cells based on whether an engine of the hybrid vehicle generates power.

15 Claims, 4 Drawing Sheets

(56) References Cited

U.S. PATENT DOCUMENTS

| | | | | |
|---|---|---|---|---|
| 2014/0180519 A1* | 6/2014 | Niimi | ............... | B60K 6/445 |
| | | | | 701/22 |
| 2015/0283913 A1* | 10/2015 | Chemin | ............ | H02M 3/33584 |
| | | | | 307/10.1 |
| 2015/0303739 A1* | 10/2015 | Shibata | ............... | B60R 16/03 |
| | | | | 290/38 C |
| 2016/0107635 A1* | 4/2016 | Kodawara | ............... | B60K 6/48 |
| | | | | 701/22 |
| 2016/0214601 A1* | 7/2016 | Ito | ............... | B60K 6/48 |

* cited by examiner

POWER SUPPLY APPARATUS AND METHOD FOR HYBRID VEHICLE

CROSS-REFERENCE TO RELATED APPLICATION

This application claims priority to and the benefit of Korean Patent Application No. 10-2014-0135878, filed on Oct. 8, 2014, the disclosure of which is incorporated herein by reference in its entirety.

BACKGROUND

1. Field of the Invention

The present invention relates to a power supply apparatus and method for a hybrid vehicle, and more particularly, to a power supply apparatus and method for a hybrid vehicle in which a power conversion device and an energy storage device are integrated in order to reduce a size and production cost of the power supply apparatus.

2. Discussion of Related Art

In general, a 48V Mild Hybrid Electric Vehicle (HEV) is a hybrid vehicle made for the purpose of improving fuel efficiency and reducing carbon dioxide emission by stopping the engine when the vehicle is stopped, performing regenerative braking when the vehicle decelerates, and performing engine torque assistance when the vehicle accelerates.

Compared with an existing HEV, a 48V Mild HEV may additionally include a hybrid function by replacing an alternator and adding a 48V power device without changing a vehicle body, thus improving fuel efficiency at a low cost.

Since the body of such a 48V Mild HEV cannot be changed, the size and mountability are very important factors in developing vehicle components and implementing a system.

In a conventional 48V system installed in such a 48 Mild HEV, a power conversion device and an energy storage device are separated from each other.

Figure 1:
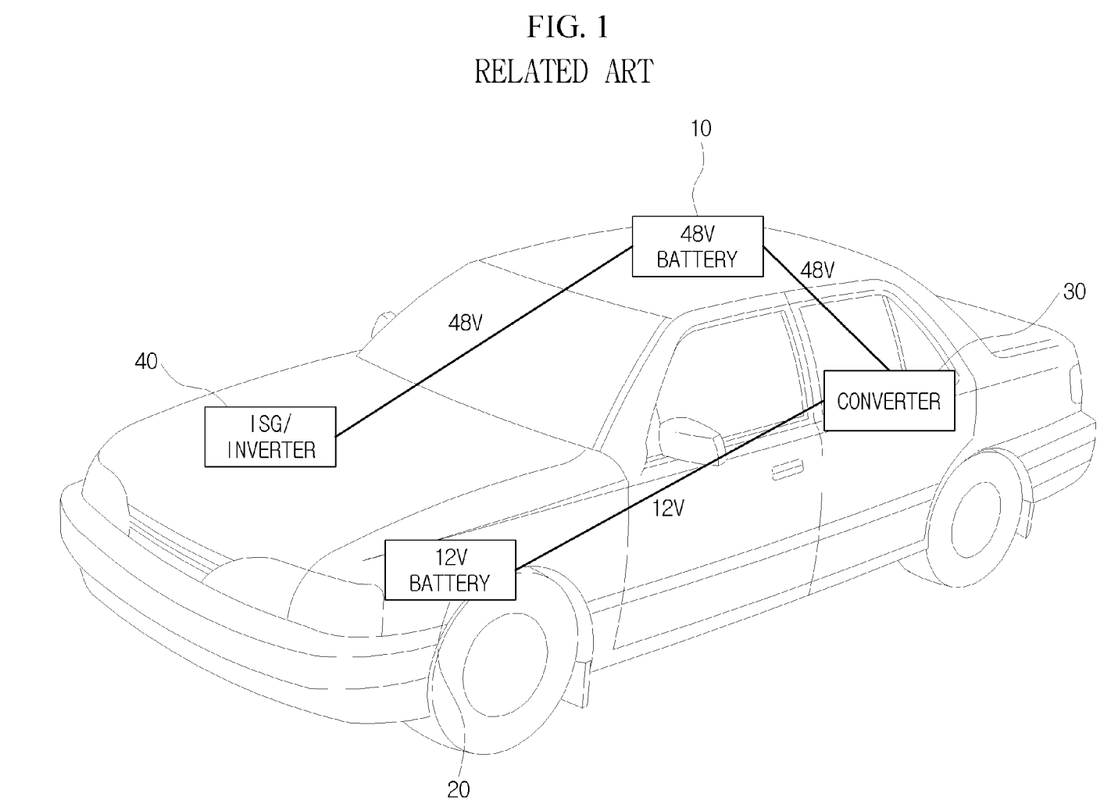
FIG. 1 is a view showing a configuration of a conventional 48V system installed in a 48V Mild HEY.

For example, FIG. 1 is a view showing a configuration of a conventional electric system installed in a 48V Mild HEY. As shown in FIG. 1, the conventional electric system installed in the 48V Mild HEV includes a 48V battery 10, a 12V battery 20, a converter 30, and an inverter combined with an integrated starter-generator (ISG) (ISG/inverter) 40.

When an engine is started, the 48V battery 10 supplies 48V DC power to the inverter 40.

When the engine is started, the 12V battery 20 supplies 12V DC power to the converter 30.

The converter 30 converts the 12V DC power supplied from the 12V battery 20 into 48V DC power when the engine is started, and then supplies the converted 48V DC power to the inverter 40.

The inverter 40 converts the 48V DC power supplied from the 48V battery 10 and the 48V DC power supplied from the converter 30 into 48V AC power when the engine is started, and then supplies the converted 48V AC power to the ISG In addition, when the engine generates power, the inverter 40 converts the AC power supplied from the ISG into the 48V DC power, and then supplies the converted 48V DC power to the 48V battery 10 and the converter 30.

The converter 30 converts the 48V DC power supplied from the inverter 40 into 12V DC power when the engine generates power, and then supplies the converted 12V DC power to the 12V battery 20.

The 48V battery 10 stores the 48V DC power supplied from the inverter 40 when the engine generates power.

The 12V battery 20 stores the 12V DC power supplied from the converter 30 when the engine generates power.

Here, the inverter 40 and the converter 30 are included in a power conversion device, and the 48V battery 10 and the 12V battery 20 are included in an energy storage device.

As described above, the conventional electric system installed in the 48V Mild HEV has the power conversion device and the energy storage device, which are separated from each other, and thus has difficulties in reducing a size and production cost of the 48V Mild HEY.

SUMMARY OF THE INVENTION

The present invention is directed to a power supply apparatus and method for a hybrid vehicle in which a power conversion device and an energy storage device are integrated in order to reduce a size and production cost of the power supply apparatus.

According to an aspect of the present invention, there is provided a power supply apparatus for a hybrid vehicle, the power supply apparatus including a battery unit including a plurality of battery cells configured to store different levels of power and a power control unit configured to control the battery unit to integrally or selectively output the power of the plurality of battery cells based on whether an engine of the hybrid vehicle generates power.

The power control unit may allow the power of the plurality of battery cells to be integrally output when the engine of the hybrid vehicle is started and may allow the power of the plurality of battery cells to be selectively output when the engine of the hybrid vehicle generates the power.

The power control unit may include a capacitor unit configured to divide the power output from the battery unit into first power and second power that is lower than the first power and store the first power and the second power in a first capacitor and a second capacitor connected in series with each other, respectively, a converter unit configured to integrate the first power output from the first capacitor and the second power output from the second capacitor and output the integrated power as direct current (DC) power, and an inverter unit configured to convert the DC power output from the converter unit into alternating current (AC) power and supply the AC power to the engine of the hybrid vehicle.

The battery unit may include a first battery cell and a second battery cell having lower output power than the first battery cell, and the power control unit may control the battery unit to supply the output power of the second battery cell to an electric field load of the hybrid vehicle.

A positive electrode of the first battery cell is connected in series with a first power source, a negative electrode of the first battery cell is connected in series with a positive electrode of the second battery cell and connected in parallel with a second power source having lower power than the first power source, and the positive electrode of the second battery cell is connected in series with the second power source and a negative electrode of the second battery cell is connected in series with a ground.

The first capacitor may have one end connected in series with the first power source and the other end connected in series with one end of the second capacitor and connected in parallel with one end of an inductor and the negative electrode of the first battery cell, and the second capacitor may have one end connected in parallel with the positive electrode of the second battery cell and the other end connected in parallel with the ground and the negative electrode of the second battery cell.

The inverter unit may include first to sixth insulated gate field effect transistors (IGFETs), and the first and fourth IGFETs connected in series with each other, the second and fifth IGFETs connected in series with each other, and the third and sixth IGFETs connected in series with each other may be connected in parallel with one another.

Drain electrodes of the first to third IGFETs may be connected in series with the first power source, source electrodes of the first to third IGFETs may be connected in series with drain electrodes of the fourth to sixth IGFETs, respectively, and source electrodes of the fourth to sixth IGFETs may be connected in series with a ground.

The inverter unit may further include first to sixth diodes, and negative electrodes of the first to sixth diodes may be connected in parallel with drain electrodes of the first to sixth IGFETs, and positive electrodes of the first to sixth diodes may be connected in parallel with source electrodes of the first to sixth IGFETs.

The converter unit may include seventh and eighth IGFETs connected in series with each other, and a drain electrode of the seventh IGFET may be connected to the first power source, a source electrode of the seventh IGFET may be connected in series with a drain electrode of the eighth IGFET, and a source electrode of the eighth IGFET may be connected to the ground.

The converter unit may further include an inductor, and the inductor may have one end connected to the capacitor unit and the other end connected in parallel with the source electrode of the seventh IGFET and the drain electrode of the eighth IGFET.

According to another aspect of the present invention, there is provided a power supply method for a hybrid vehicle including a battery unit and a power control unit, in which the battery unit includes a plurality of battery cells storing different levels of power, the power supply method including controlling, by the power control unit, the battery unit to integrally output the power of the plurality of battery cells when an engine of the hybrid vehicle is started and controlling, by the power control unit, the battery unit to selectively output the power of the plurality of battery cells when the engine of the hybrid vehicle generates power.

The controlling of the battery unit to integrally output the power may include dividing the power output from the battery unit into first power and second power and store the first power and second power in a first capacitor and a second capacitor connected in series with each other, respectively.

The controlling of the battery unit to integrally output the power may further include integrating the first power output from the first capacitor and the second power output from the second capacitor to output the integrated power as DC power; and converting the output DC power into AC power to supply the AC power to the engine of the hybrid vehicle.

The battery unit may include a first battery cell and a second battery cell having lower output power than the first batter cell, and the controlling of the battery unit to selectively output the power may include controlling the battery unit to supply the output power of the second battery cell to an electric field load of the hybrid vehicle.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A power supply apparatus for a hybrid vehicle according to an embodiment of the present invention will be described below with reference to FIGS. 2 to 4.

Figure 2:
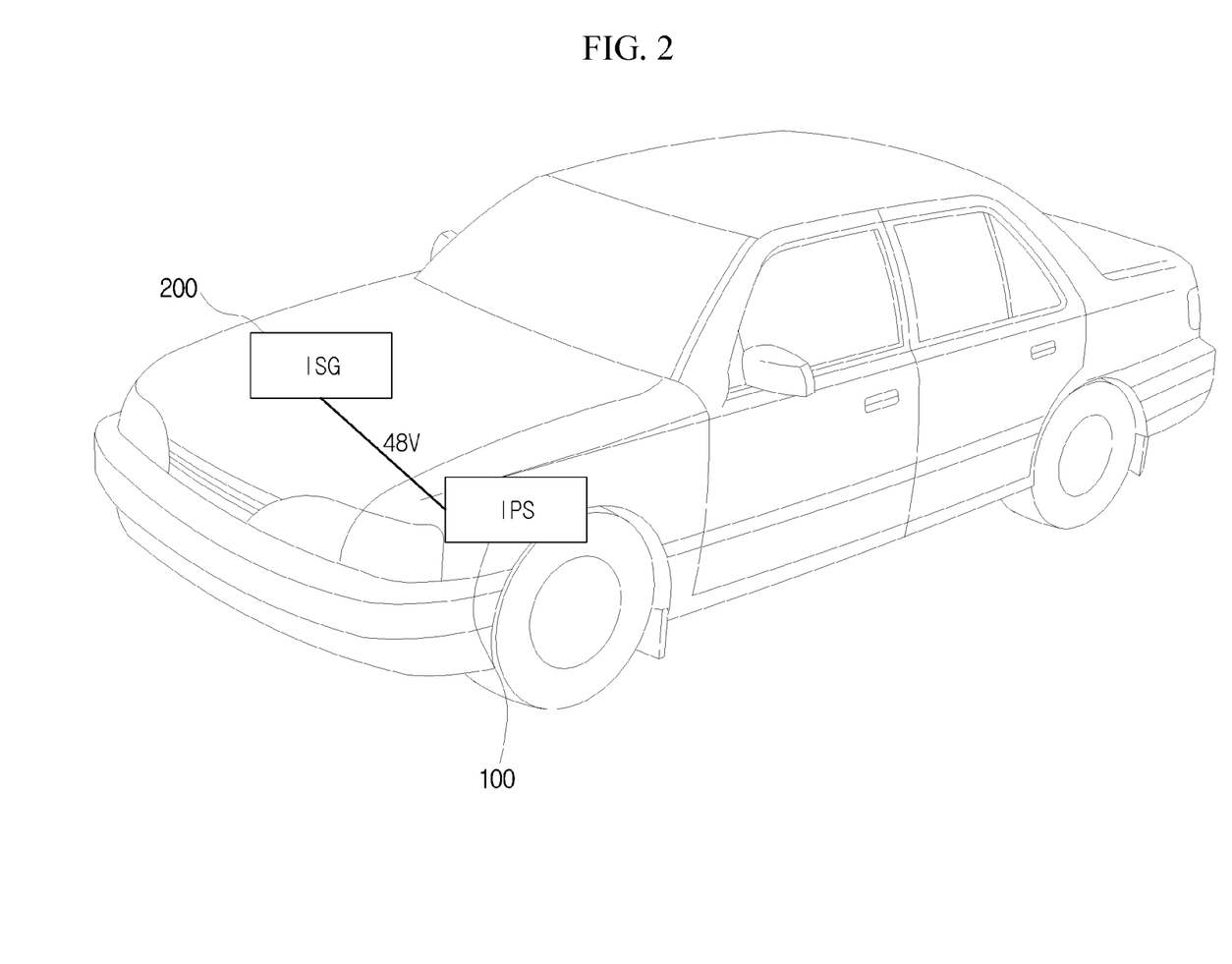
FIG. 2 is a view showing a power supply apparatus for a hybrid vehicle according to an embodiment of the present invention.
Figure 3:
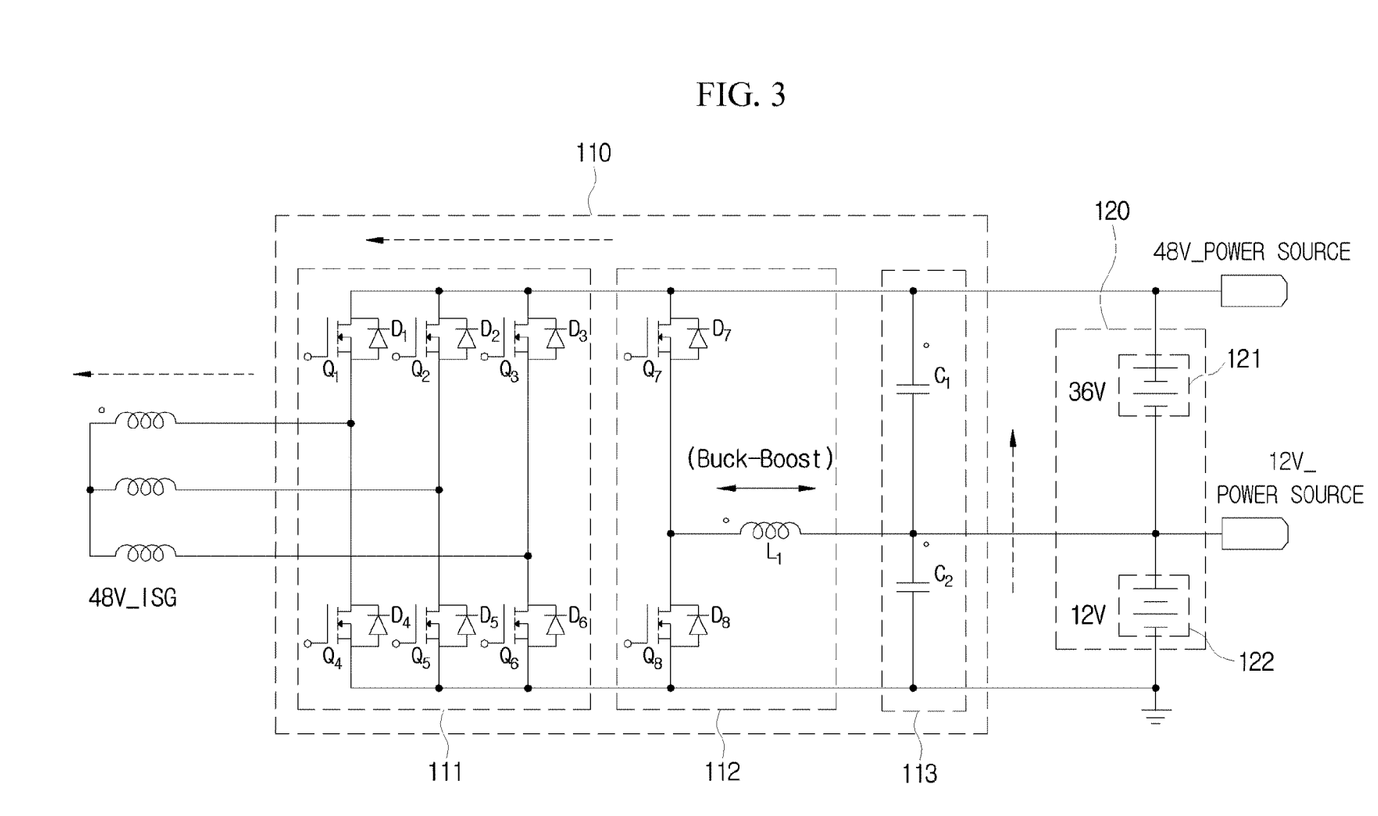
FIGS. 3 and 4 are circuit diagrams showing a power supply apparatus for a hybrid vehicle according to an embodiment of the present invention.
Figure 4:
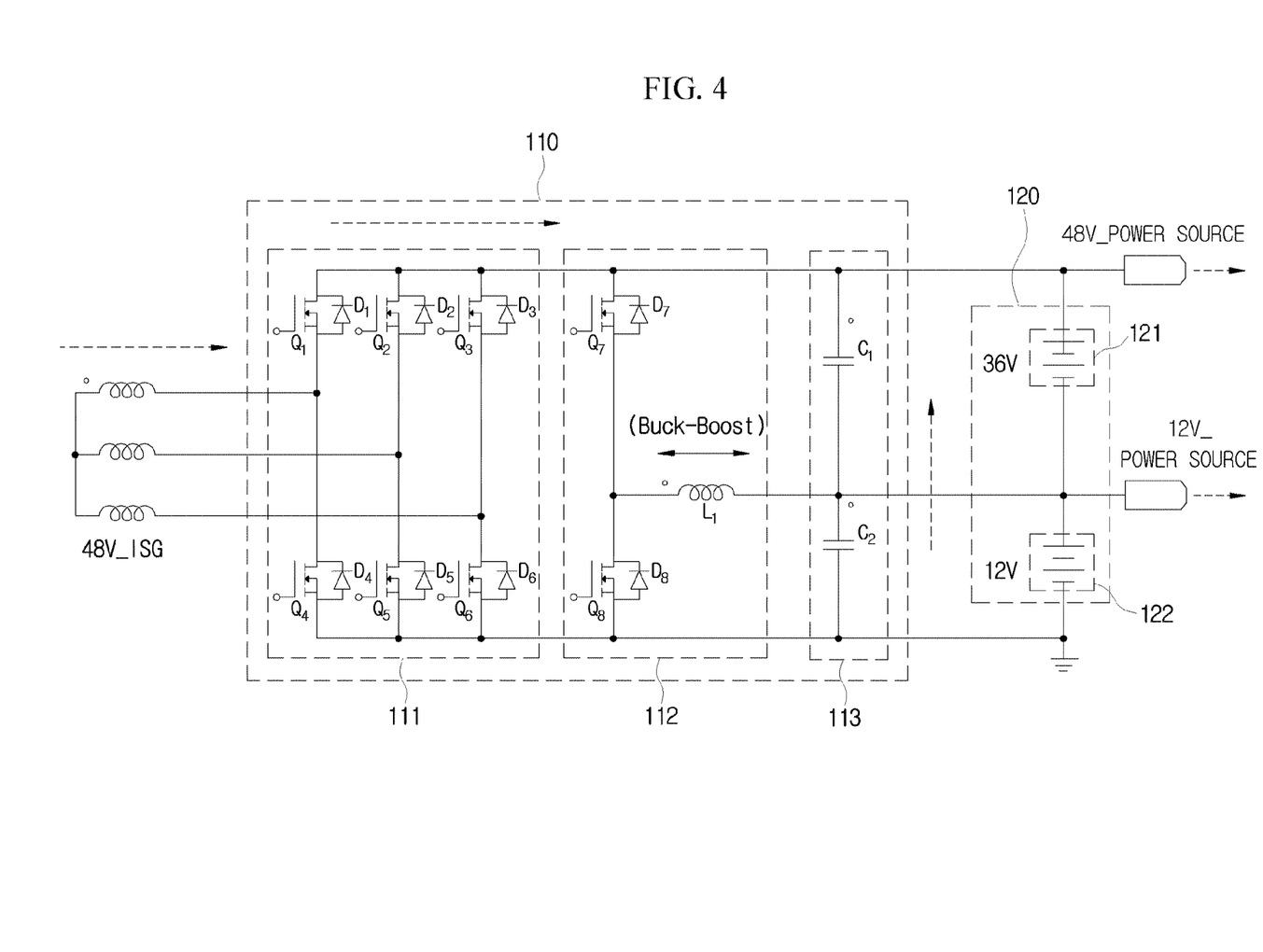

FIG. 2 is a view showing the power supply apparatus for the hybrid vehicle according to an embodiment of the present invention, and FIGS. 3 and 4 are circuit diagrams showing the power supply apparatus for the hybrid vehicle according to an embodiment of the present invention.

As shown in FIG. 2, the power supply apparatus for the hybrid vehicle according to an embodiment of the present invention includes an integrated power system (IPS) 100 and an integrated starter-generator (ISG) 200.

As shown in FIGS. 3 and 4, the integrated power system 100 supplies predetermined power (e.g., 48V power) to the ISG 200 and includes a power control unit (PCU) 110 and a battery unit 120.

The PCU 110 includes an inverter unit 111, a converter unit 112, and a capacitor unit 113.

The inverter unit 111 converts DC power into AC power and includes six n-channel type insulated gate field effect transistors (IGFETs) Q1, Q2, Q3, Q4, Q5, and Q6 and six diodes D1, D2, D3, D4, D5, and D6.

A circuit configuration of the inverter unit 111 will be described below in more detail.

The inverter unit 111 includes a first IGFET Q1, a second IGFET Q2, a third IGFET Q3, a fourth IGFET Q4, a fifth IGFET Q5, and a sixth IGFET Q6.

First, the first IGFET Q1 and the fourth IGFET Q4 are connected in series with each other.

For example, the first IGFET Q1 has a drain electrode connected in series with a first power source (e.g., a 48V power source) and a source electrode connected in series with a drain electrode of the fourth IGFET Q4. The fourth IGFET Q4 has a drain electrode connected in series with a source electrode of the first IGFET Q1 and a source electrode connected in series with the ground.

In addition, the first IGFET Q1 is connected in parallel with the first diode D1, and the fourth IGFET Q4 is connected in series with the fourth diode D4.

For example, the first IGFET Q1 has a drain electrode connected in parallel with a negative electrode of the first diode D1 and a source electrode connected in parallel with a positive electrode of the first diode D1. The fourth IGFET Q4 has a drain electrode connected in parallel with a negative electrode of the fourth diode D4 and a source electrode connected in parallel with a positive electrode of the fourth diode D4.

The second IGFET Q2 and the fifth IGFET Q5 are connected in series with each other.

For example, the second IGFET Q2 has a drain electrode connected in series with a 48V power source and a source electrode connected in series with a drain electrode of the fifth IGFET Q5. The fifth IGFET Q5 has a drain electrode connected in series with a source electrode of the second IGFET Q2 and a source electrode connected in series with the ground.

In addition, the second IGFET Q2 is connected in parallel with the second diode D2, and the fifth IGFET Q5 is connected in parallel with the fifth diode D5.

For example, the second IGFET Q2 has a drain electrode connected in parallel with a negative electrode of the second diode D2 and a source electrode connected in parallel with a positive electrode of the second diode D2. The fifth IGFET Q5 has a drain electrode connected in parallel with a negative electrode of the fifth diode D5 and a source electrode connected in parallel with a positive electrode of the fifth diode D5.

The third IGFET Q3 and the sixth IGFET Q6 are connected in series with each other.

For example, the third IGFET Q3 has a drain electrode connected in series with a 48V power source and a source electrode connected in series with a drain electrode of the sixth IGFET Q6. The sixth IGFET Q6 has a drain electrode connected in series with a source electrode of the third IGFET Q3 and a source electrode connected in series with the ground.

In addition, the third IGFET Q3 is connected in parallel with the third diode D3, and the sixth IGFET Q6 is connected in parallel with the sixth diode D6.

For example, the third IGFET Q3 has a drain electrode connected in parallel with a negative electrode of the third diode D3 and a source electrode connected in parallel with a positive electrode of the third diode D3. The sixth IGFET Q6 has a drain electrode connected in parallel with a negative electrode of the sixth diode D6 and a source electrode connected in parallel with a positive electrode of the sixth diode D6.

As described above, the inverter unit 111 has the first IGFET Q1 and the fourth IGFET Q4 connected in series with each other, the second IGFET Q2 and the fifth IGFET Q5 connected in series with each other, and the third IGFET Q3 and the sixth IGFET Q6 connected in series with each other. Moreover, the first IGFET Q1 and fourth IGFET Q4 connected in series with each other, the second IGFET Q2 and fifth IGFET Q5 connected in series with each other, and the third IGFET Q3 and sixth IGFET Q6 connected in series with each other are connected in parallel with one another.

The converter unit 112 receives first power (e.g., 36V power) and second power (e.g., 12V power) from the capacitor unit 113 and transfers predetermined power (e.g., 48V power), which is a sum of the first power and the second power, to the inverter unit 111. The converter unit 112 includes two N-channel type IGFETs Q7 and Q8 and one inductor L1.

A circuit configuration of the converter unit 112 will be described below in more detail.

The converter unit 112 includes the seventh IGFET Q7 and the eighth IGFET Q8, and the seventh IGFET Q7 and the eighth IGFET Q8 are connected in series with each other.

For example, the seventh IGFET Q7 has a drain electrode connected in series with a 48V power source and a source electrode connected in series with a drain electrode of the eighth IGFET Q8. The eighth IGFET Q8 has a drain electrode connected in series with a source electrode of the seventh IGFET Q7 and a source electrode connected in series with the ground.

In addition, the seventh IGFET Q7 is connected in parallel with the seventh diode D7, and the eighth IGFET Q8 is connected in parallel with the eighth diode D8.

For example, the seventh IGFET Q7 has a drain electrode connected in parallel with a negative electrode of the seventh diode D7 and a source electrode connected in parallel with a positive electrode of the seventh diode D7. The eighth IGFET Q8 has a drain electrode connected in parallel with a negative electrode of the eighth diode D8 and a source electrode connected in parallel with a positive electrode of the eighth diode D8.

The first inductor L1 has one end connected to the capacitor unit 113. The first inductor L1 has the other end connected in parallel with a source electrode of the seventh IGFET Q7 and connected in parallel with a drain electrode of the eighth IGFET Q8.

As described above, the converter unit 112 is connected in parallel with the inverter unit 111, and connected with the capacitor unit 113 through the first inductor L1.

The capacitor unit 113 receives and stores the first power (e.g., 36V power) and the second power (e.g., 12V power) from the battery unit 120. The capacitor unit 113 includes a first capacitor C1 and a second capacitor C2. Here, the first capacitor C1 may be a 36V capacitor that receives and stores the 36V power from the battery unit 120, and the second capacitor C2 may be a 12V capacitor that receives and stores the 12V power from the battery unit 120. The following description assumes that the first capacitor C1 and the second capacitor C2 are a 36V capacitor and a 12V capacitor, respectively.

The 36V capacitor C1 has one end connected in series with a 48V power source and the other end connected in series with one end of the 12V capacitor C2.

The 12V capacitor C2 has one end connected in series with the other end of the 36V capacitor C1 and the other end connected in series with the ground.

In addition, the 36V capacitor C1 has the other end connected in parallel with one end of the first inductor L1, and the 12V capacitor C2 has one end connected in parallel with one end of the first inductor L1.

The battery unit 120 includes a first battery cell 121 and a second battery cell 122. Here, the first battery cell 121 may be a 36V battery cell, and the second battery cell 122 may be a 12V battery cell. The following description assumes that the first battery cell 121 is a 36V battery cell and the second battery cell 122 is a 12V battery cell.

The 36V battery cell 121 and the 12V battery cell 122 are connected in series with each other.

For example, the 36V battery cell 121 has a positive electrode connected in series with the 48V power source. The 36V battery cell 121 has a negative electrode connected in series with a positive electrode of the 12V battery cell 122 and connected in parallel with a second power source (e.g., a 12V power source). Here, the second power source may have lower power than the first power source.

The 12V battery cell 122 has a positive electrode connected in series with a negative electrode of the 36V battery cell 121 and connected in series with the 12V power source. The 12V battery cell 122 has a negative electrode connected in series with the ground.

As described above, according to an embodiment of the present invention, it is possible to improve assemblability and simplify a process by integrating the power conversion device, in which the converter and the inverter are included, and the energy storage device. It is also possible to reduce a capacity of the converter according to a 36V/12V cell voltage balancing function to decrease the number of components and save the production cost by using one integrated 48V battery instead of a 48V battery and a 12V battery, which are separated from each other.

FIGS. 3 and 4 are circuit diagrams showing the power supply apparatus for the hybrid vehicle according to an embodiment of the present invention. In detail, FIG. 3 is a circuit diagram showing the flow of power as a direction of an arrow when an engine of a hybrid vehicle is started, and FIG. 4 is a circuit diagram showing the flow of power as a direction of an arrow when the engine of the hybrid vehicle generates power.

As shown in FIG. 3, the flow of power when engine is started is in the direction of the arrow.

For example, when a vehicle stops and then goes, the engine is stopped and then restarted, and the battery unit 120 is discharged to transfer 48V power to the power control unit 110.

The power control unit 110 transfers the 48V transferred by the battery unit 120 to a 48V ISG Finally, the 48V ISG supplies the 48V power transferred by the battery unit 120 to the engine.

In addition, as shown in FIG. 4, the flow of power when the engine generates power is in the direction of the arrow.

For example, when a vehicle is running, the engine is operated to transfer the power to the 48V ISG, and the 48V ISG transfers the power of the engine to the power control unit 110.

The power control unit 110 supplies the power transferred from the 48V ISG to the battery unit 120. The battery unit 120 charges the power supplied from the power control unit 110.

According to an embodiment of the present invention, it is possible to improve assemblability and simplify a process by integrating the power conversion device, in which the converter and the inverter are included, and the energy storage device.

It is also possible to reduce a capacity of the converter according to a 36V/12V cell voltage balancing function to decrease the number of components and save the production cost by using one integrated 48V battery instead of a 48V battery and a 12V battery, which are separated from each other.

It is also possible to improve performance of the ISG by forming the ISG as an independent structure rather than a structure integrated with an inverter to increase the capacity of the ISG It should be understood that although the present invention has been described above in detail with reference to the accompanying drawings and exemplary embodiments, this is illustrative only and various modifications may be made without departing from the spirit or scope of the invention. Thus, the scope of the present invention is to be determined by the following claims and their equivalents, and shall not be restricted or limited by the foregoing detailed description.

What is claimed is:

1. A power supply apparatus for a hybrid vehicle, the power supply apparatus comprising:
   a battery unit including battery cells configured to store different levels of power; and
   a power control unit comprising a capacitor unit and a converter unit, and configured to control the battery unit to selectively output a power of the battery cells based on whether an engine of the hybrid vehicle generates the power,
   wherein the capacitor unit divides the power of the battery cells into a first power and a second power lower than the first power, stores the first power in a first capacitor, and stores the second power in a second capacitor connected in series with the first capacitor, and
   wherein the converter unit receives the first power from the first capacitor and the second power from the second capacitor, and outputs a sum of the first power and the second power.

2. The power supply apparatus of claim 1, wherein the power control unit allows the power of the battery cells to be output when the engine of the hybrid vehicle is started and allows the power of the battery cells to be selectively output when the engine of the hybrid vehicle generates the power.

3. The power supply apparatus of claim 2, wherein the converter unit outputs the sum of the first and second powers as a direct current (DC) power, and
   wherein the power control unit further comprises an inverter unit configured to convert the DC power output from the converter unit into an alternating current (AC) power and supply the AC power to the engine of the hybrid vehicle.

4. The power supply apparatus of claim 3, wherein,
   the battery unit comprises a first battery cell and a second battery cell having a lower output power than the first battery cell, and
   the power control unit controls the battery unit to supply the output power of the second battery cell to an electric field load of the hybrid vehicle.

5. The power supply apparatus of claim 4, wherein,
   a positive electrode of the first battery cell is connected in series with a first power source and a negative electrode of the first battery cell is connected in series with a positive electrode of the second battery cell and connected in parallel with a second power source having a lower power than the first power source, and
   the positive electrode of the second battery cell is connected in series with the second power source and a negative electrode of the second battery cell is connected in series with a ground.

6. The power supply apparatus of claim 5, wherein,
   the first capacitor has one end connected in series with the first power source and the other end connected in series with one end of the second capacitor and connected in parallel with one end of an inductor and the negative electrode of the first battery cell, and
   the second capacitor has one end connected in parallel with the positive electrode of the second battery cell and the other end connected in parallel with the ground and the negative electrode of the second battery cell.

7. The power supply apparatus of claim 6, wherein,
   the inverter unit comprises first to sixth insulated gate field effect transistors (IGFETs), and
   the first and fourth IGFETs connected in series with each other, the second and fifth IGFETs connected in series with each other, and the third and sixth IGFETs connected in series with each other are connected in parallel with one another.

8. The power supply apparatus of claim 7, wherein drain electrodes of the first to third IGFETs are connected in series with the first power source, source electrodes of the first to third IGFETs are connected in series with drain electrodes of the fourth to sixth IGFETs, respectively, and source electrodes of the fourth to sixth IGFETs are connected in series with a ground.

9. The power supply apparatus of claim 8, wherein,
the inverter unit further comprises first to sixth diodes, and
negative electrodes of the first to sixth diodes are connected in parallel with drain electrodes of the first to sixth IGFETs, and positive electrodes of the first to sixth diodes are connected in parallel with source electrodes of the first to sixth IGFETs.

10. The power supply apparatus of claim 9, wherein,
the converter unit comprises seventh and eighth IGFETs connected in series with each other, and
a drain electrode of the seventh IGFET is connected to the first power source, a source electrode of the seventh IGFET is connected in series with a drain electrode of the eighth IGFET, and a source electrode of the eighth IGFET is connected to the ground.

11. The power supply apparatus of claim 10, wherein,
the converter unit further comprises an inductor, and
the inductor has one end connected to the capacitor unit and the other end connected in parallel with the source electrode of the seventh IGFET and the drain electrode of the eighth IGFET.

12. A power supply method for a hybrid vehicle including a battery unit and a power control unit, in which the battery unit includes battery cells storing different levels of power, the power supply method comprising:
controlling, by the power control unit, the battery unit to output a power of the battery cells when an engine of the hybrid vehicle is started; and
controlling, by the power control unit, the battery unit to selectively output the power of the battery cells when the engine of the hybrid vehicle generates power,
wherein the power control unit comprises:
a capacitor unit that divides the power of the battery cells into a first power and a second power lower than the first power, stores the first power in a first capacitor, and stores the second power in a second capacitor connected in series with the first capacitor; and
a converter unit that receives the first power from the first capacitor and the second power from the second capacitor, and outputs a sum of the first power and the second power.

13. The power supply method of claim 12, wherein the controlling of the battery unit to output the power comprises dividing the power output from the battery unit into the first power and the second power and storing the first power and second power in the first capacitor and the second capacitor connected in series with each other, respectively.

14. The power supply method of claim 13, wherein the controlling of the battery unit to output the power further comprises:
integrating the first power output from the first capacitor and the second power output from the second capacitor to output the sum of the first power and the second power as a direct current (DC) power; and
converting the output DC power into an alternating current (AC) power to supply the AC power to the engine of the hybrid vehicle.

15. The power supply method of claim 14, wherein,
the battery unit comprises a first battery cell and a second battery cell having a lower output power than the first battery cell, and
the controlling of the battery unit to selectively output the power comprises controlling the battery unit to supply the output power of the second battery cell to an electric field load of the hybrid vehicle.

* * * * *